US009223800B1

(12) United States Patent
Faibish et al.

(10) Patent No.: US 9,223,800 B1
(45) Date of Patent: Dec. 29, 2015

(54) CLUSTER FILE SYSTEM PROVIDING OBJECT STORE AND FUNCTIONALITY FOR TRANSFORMATION OF METADATA FILES INTO OBJECTS

(71) Applicant: EMC Corporation, Hopkinton, MA (US)

(72) Inventors: Sorin Faibish, Newton, MA (US); John M. Bent, Los Alamos, NM (US); James M. Pedone, Jr., West Boylston, MA (US)

(73) Assignee: EMC Corporation, Hopkinton, MA (US)

( * ) Notice: Subject to any disclaimer, the term of this patent is extended or adjusted under 35 U.S.C. 154(b) by 177 days.

(21) Appl. No.: 14/138,260

(22) Filed: Dec. 23, 2013

(51) Int. Cl.
*G06F 17/00* (2006.01)
*G06F 17/30* (2006.01)

(52) U.S. Cl.
CPC .... *G06F 17/30233* (2013.01); *G06F 17/30224* (2013.01)

(58) Field of Classification Search
CPC ............ G06F 9/45533; G06F 2201/84; G06F 17/30091; G06F 9/45558; G06F 11/1448; G06F 11/1469
See application file for complete search history.

(56) References Cited

U.S. PATENT DOCUMENTS

2005/0210084 A1* 9/2005 Goldick et al. ... G06F 17/30067

OTHER PUBLICATIONS

J. Bent et al., "PLFS: A Checkpoint Filesystem for Parallel Applications," ACM Proceedings of the Conference on High Performance Computing Networking, Storage and Analysis (SC09), Nov. 2009, pp. 1-12.
Cluster File Systems, Inc., "Lustre: A Scalable, High-Performance File System," Nov. 2002, pp. 1-13.
F. Wang et al., "Understanding Lustre Filesystem Internals," National Center for Computational Sciences, Tech Report ORNL/TM-2009/117, Apr. 2009, pp. 1-80.

* cited by examiner

*Primary Examiner* — Truong Vo
(74) *Attorney, Agent, or Firm* — Ryan, Mason & Lewis, LLP

(57) ABSTRACT

A cluster file system includes a physical file system and a virtual file system arranged between the physical file system and multiple clients. The virtual file system comprises a data object processing module configured to receive multiple data files from each of one or more of the clients and to transform the data files into data objects for object-based storage in the physical file system. The virtual file system further comprises a metadata object processing module configured to receive metadata files associated with the data files and to transform the metadata files into metadata objects for object-based storage in the physical file system. The virtual file system thereby implements multiple object stores utilizing the physical file system for independent storage of data objects and metadata objects but presents a file-based interface to the clients. In some embodiments, the virtual file system illustratively comprises a parallel log-structured file system (PLFS).

23 Claims, 5 Drawing Sheets

CLUSTER FILE SYSTEM PROVIDING OBJECT STORE AND FUNCTIONALITY FOR TRANSFORMATION OF METADATA FILES INTO OBJECTS

FIELD

The field relates generally to information processing systems, and more particularly to information processing systems that incorporate cluster file systems.

BACKGROUND

It is common in high-performance computing (HPC) systems and other information processing systems for multiple compute nodes to access a cluster file system. For example, HPC systems such as supercomputers typically include large numbers of compute nodes that access a parallel file system, distributed file system or other type of cluster file system. A cluster file system as the term is broadly used herein generally allows multiple compute nodes or other types of clients to share access to files over a network.

One well-known cluster file system is the Lustre file system. Lustre is a Linux-based high performance cluster file system utilized for computer clusters ranging in size from small workgroup clusters to large-scale, multi-site clusters. Lustre can readily scale to support tens of thousands of clients, petabytes of storage capacity, and hundreds of gigabytes per second of aggregate input-output (IO) throughput. Due to its high performance and scalability, Lustre is utilized in many supercomputers, as well as other complex computing environments, including large enterprise data centers.

In conventional Lustre implementations, it can be difficult to balance the conflicting requirements of storage capacity and IO throughput. TO operations on object storage servers are generally performed directly with back-end storage arrays associated with those servers, and the corresponding storage devices may not be well matched to the current needs of the system. This can lead to situations in which either performance is less than optimal or the costs of implementing the system become excessive.

Accordingly, despite the many advantages of Lustre file systems and other similar cluster file systems, a need remains for additional improvements, particularly with regard to IO operations. For example, further acceleration of IO operations, leading to enhanced system performance relative to conventional arrangements, would be desirable. Additionally or alternatively, an ability to achieve particular levels of performance at lower cost would be advantageous.

SUMMARY

Illustrative embodiments of the present invention provide techniques for implementing separate data and metadata object stores in a cluster file system comprising a virtual file system and an underlying physical file system. The virtual file system interfaces compute nodes or other clients of a computer system with the underlying physical file system. The resulting arrangements allow a cluster file system to be configured in a particularly efficient manner utilizing any type of underlying physical file system. This permits acceleration of IO operations, leading to enhanced system performance relative to conventional arrangements, while also providing an ability to achieve particular levels of performance at lower cost.

In one embodiment, a cluster file system includes a physical file system and a virtual file system arranged between the physical file system and multiple clients. The virtual file system comprises a data object processing module configured to receive multiple data files from each of one or more of the clients and to transform the data files into data objects for object-based storage in at least one data object store of the physical file system. The virtual file system further comprises a metadata object processing module configured to receive metadata files associated with the data files and to transform the metadata files into metadata objects for object-based storage in at least one metadata object store of the physical file system. The virtual file system thereby implements multiple object stores utilizing the physical file system for independent storage of data objects and metadata objects but presents a file-based interface to the clients.

By way of example, the virtual file system may comprise a parallel log-structured file system (PLFS) with the data objects and metadata objects corresponding to respective containers of the PLFS.

Other embodiments include without limitation methods, apparatus, systems, and articles of manufacture comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Figure 1:
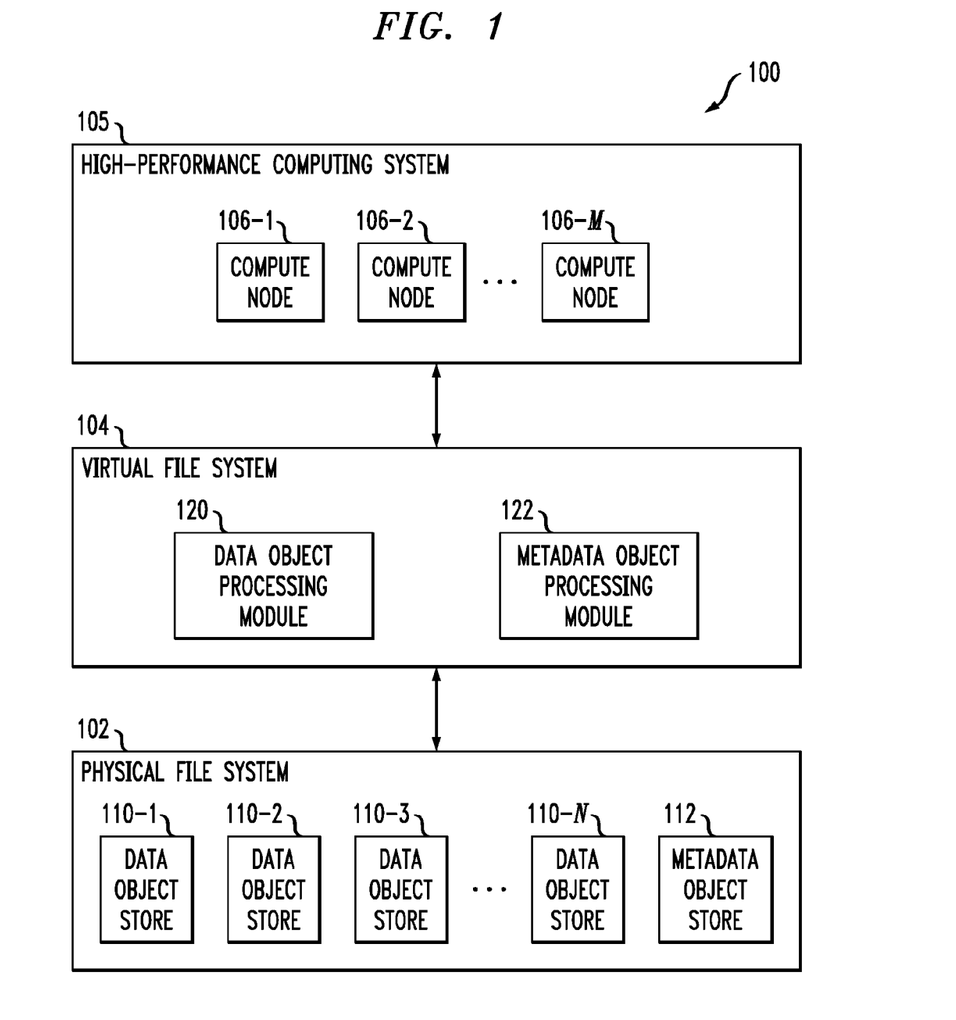
FIG. 1 is a block diagram of an information processing system implementing separate data and metadata object stores using a virtual file system and an underlying physical file system in an illustrative embodiment of the invention.

FIG. 1 shows an information processing system 100 configured in accordance with an illustrative embodiment of the present invention. The information processing system 100 comprises a physical file system 102, a virtual file system 104 and an HPC system 105 comprising a plurality of compute nodes 106-1, 106-2, . . . 106-M.

The physical file system 102 comprises a plurality of object stores, illustratively including a plurality of data object stores 110-1, 110-2, 110-3, . . . 110-N, and a single metadata object store 112.

The object stores may be configured using multiple storage tiers such as, for example, at least one object storage server or OSS tier of a parallel file system and at least one burst buffer tier implemented in one or more burst buffer appliances, or multiple OSS tiers of a parallel file system, although such storage tiers are not explicitly shown in the figure.

As one example of the latter type of storage tiering arrangement, the multiple storage tiers may include at least first and second storage tiers comprising respective disjoint subsets of a plurality of OSSs, with the OSSs in the first storage tier being configured to interface with object storage targets or OSTs of a first type and the OSSs in the second storage tier being configured to interface with OSTs of a second type different than the first type. The first and second different types of OSTs provide respective different levels of performance, as in an arrangement in which the OSTs of the first type comprise respective flash storage devices and the OSTs of the second type comprise respective disk storage devices.

Of course, these particular tiering arrangements should be considered exemplary only, and numerous alternative arrangements of two or more storage tiers may be utilized in providing at least a subset of the data and metadata object stores in the physical file system 102 in other embodiments.

For example, the use of Lustre OSSs is not a requirement, and numerous other file systems can be used in the physical file system 102. Alternative object stores that can be used include Ceph, as well as other types of object stores. Such object stores can use a variety of other arrangements of object storage elements, and are not limited to utilization of object storage servers. It is also possible in other embodiments to implement the physical file system 102 using other types of file systems, such as, for example, Hadoop Distributed File System (HDFS) or General Parallel File System (GPFS), or using various combinations of these and other file systems.

The virtual file system 104 is arranged between the physical file system 102 and the HPC system 105. The virtual file system 104 is configured to provide an interface between the physical file system 102 and a plurality of clients illustratively comprising respective ones of the compute nodes 106 or various components thereof. The term "client" as used herein is therefore intended to be broadly construed, so as to encompass, for example, a compute node or a component thereof. Such a component may be implemented in software, and therefore a "client" as the term is utilized herein may comprise a software component associated with one of the compute nodes 106 of the HPC system 105. For example, a client may comprise an application running on a given one of the compute nodes 106.

The HPC system 105 may comprise, for example, a supercomputer. Such an HPC system is an example of what is more generally referred to herein as a "computer system."

The virtual file system 104 in the FIG. 1 embodiment comprises a data object processing module 120 and a metadata object processing module 122. The data object processing module 120 is configured to receive data files from each of one or more of the clients and to transform those data files into data objects for object-based storage in one or more of the data object stores 110 of the physical file system 102. The metadata object processing module 122 is configured to receive metadata files associated with the data files and to transform the metadata files into metadata objects for object-based storage in the metadata object store 112 of the physical file system 102. Accordingly, the virtual file system 104 implements multiple object stores utilizing the physical file system 102 for independent storage of data objects and metadata objects but presenting a file-based interface to the clients.

Although illustratively shown as being implemented externally to the HPC system 105 in the present embodiment, the virtual file system 104 in other embodiments may be implemented at least in part on the compute nodes 106.

The virtual file system 104 in the present embodiment may also be configured to perform additional storage-related functions, such as arranging retrieved objects into corresponding files for delivery to requesting clients. In embodiments in which the physical file system 102 comprises multiple storage tiers, the virtual file system 104 can control movement of objects between the storage tiers of the physical file system 102 in order to facilitate achievement of desired levels of performance by the clients.

The metadata objects stored in the metadata object store 112 in some embodiments are configured to illustratively provide sufficient information to allow requesting clients to retrieve data objects directly from the data object stores 110 without requiring further intervention of the virtual file system 104. Numerous other types of metadata can additionally or alternatively be stored as metadata objects in the metadata object store 112 under the control of the virtual file system 104.

By way of example, the information stored by the metadata object store 112 for a given one of the objects illustratively comprises a data pointer to a particular location in a data object store that currently stores a corresponding data object. Additionally or alternatively, the information stored by the metadata object store 112 for a given one of the objects may comprise a hyperlink. When such a hyperlink is activated by a corresponding one of the clients, the client is directed to the particular location in the data object store that currently stores that object. Numerous other types of pointers, hyperlinks and other information used to facilitate object-based storage in the physical file system 102 may be stored in the metadata object store 112 under the control of the virtual file system 104. Such other information stored in the metadata object store 112 may comprise, for example, file metadata, such as file names, directory structures, and access permissions.

Although only a single metadata object store 112 is shown in the FIG. 1 embodiment, it should be understood that the metadata object store 112 in some embodiments is replicated as multiple metadata object store instances in order to provide enhanced accessibility as well as protection against metadata object store failures.

As indicated above, the physical file system 102 may comprise a parallel file system having one or more object storage server or OSS tiers, possibly in combination with at least one burst buffer tier implemented using one or more burst buffer appliances. The parallel file system is assumed by way of example to comprise multiple distinct file systems arranged in parallel with one another and may comprise object storage targets or OSTs implemented using one or more storage arrays. Such storage arrays may comprise, for example, storage products such as VNX® and Symmetrix VMAX®, both commercially available from EMC Corporation of Hopkinton, Mass. A variety of other storage products may be utilized to implement at least a portion of the parallel file system.

In the present embodiment, the physical file system 102 and the virtual file system 104 collectively provide an exemplary implementation of what is more generally referred to herein as a cluster file system. At least portions of such a cluster file system may illustratively comprise a Lustre file system. Conventional aspects of Lustre file systems are described in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein.

Alternatively, as indicated previously, portions of a cluster file system may be implemented as a distributed file system such as HDFS, a parallel file system such as GPFS or as a combination of a Lustre file system with HDFS, GPFS or other parallel or distributed file systems. The term "cluster file system" as used herein is therefore intended to be broadly construed, so as to encompass, for example, Lustre file systems, distributed file systems, parallel file systems, or various combinations thereof, as well as other types of file systems implemented using one or more clusters of processing devices.

A given burst buffer appliance implemented in the physical file system 102 is generally configured to accelerate IO operations between the compute nodes 106 and the parallel file system by storing associated data in its burst buffers.

Accordingly, the term "burst buffer appliance" as used herein is intended to be broadly construed, so as to encompass any network appliance or other arrangement of hardware and associated software or firmware that collectively provides multiple burst buffers implemented using high-speed storage devices. Thus, such an appliance generally provides a high-speed memory that serves as a buffer between the compute nodes 106 of the HPC system 105 and the above-noted parallel file system, for storing bursts of data associated with different types of IO operations.

Other embodiments may include multiple burst buffer appliances, with each such appliance adapted for coupling between at least a portion of the physical file system 102 and one or more compute nodes 106 of the HPC system 105.

Numerous other types and arrangements of cluster file systems and computer systems may be used in other embodiments of the invention. Although some embodiments utilize one or more burst buffer appliances in the physical file system 102, use of burst buffer appliances is optional and may be eliminated in other embodiments.

As indicated above, the virtual file system 104 can be used to control movement of objects between storage tiers of the physical file system 102, taking into account current operating conditions and other factors.

Data object movement determinations made by the virtual file system 104 are illustratively performed in cooperation with one or more job schedulers of the information processing system 100. For example, data object movement determinations can be made at least in part utilizing a job scheduler of the system 100 responsive to JO requests received in the job scheduler from one or more applications running on the compute nodes 106. Such IO requests and other similar requests referred to herein may be configured, for example, in accordance with standard portable operating system interface (POSIX) system calls. Object movement determinations can be implemented differently for each of a plurality of processing jobs, thereby effectively allowing dynamic object migration on a per-job basis.

The virtual file system 104 updates the metadata stored in the metadata object store 112 responsive to object movement between the storage tiers of the physical file system 102. It is to be appreciated, however, that use of storage tiering is not a requirement, and some embodiments can therefore include only a single storage tier in the physical file system 102.

The virtual file system 104 in the present embodiment is assumed to be implemented using a parallel log-structured file system (PLFS), although other types of virtual file systems may be used in other embodiments.

Additional details regarding PLFS can be found in J. Bent et al., "PLFS: A Checkpoint Filesystem for Parallel Applications," ACM/IEEE Conference on High Performance Computing Networking, Storage and Analysis, SC09, Portland, Oreg., Nov. 14-20, 2009, pp. 1-12, which is incorporated by reference herein. It is to be appreciated, however, that PLFS is not a requirement of any particular embodiment.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

At least portions of the physical file system 102, the virtual file system 104, and the HPC system 105 comprising compute nodes 106 may be implemented using one or more processing platforms, examples of which will be described in greater detail below in conjunction with FIGS. 6 and 7. A given such processing platform comprises at least one processing device comprising a processor coupled to a memory, and the processing device may be implemented at least in part utilizing one or more virtual machines.

Although shown in FIG. 1 as being separate from the physical file system 102 and compute nodes 106, the virtual file system 104 in other embodiments may be implemented at least in part within one or more of these system elements. It is also to be appreciated that a given embodiment of the information processing system 100 may include multiple instances of one or more of the physical file system 102, the virtual file system 104 and the set of M compute nodes 106, although only a single instance of each of these elements is shown in the system diagram for clarity and simplicity of illustration.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in greater detail with reference to the flow diagram of FIG. 2. The process as shown includes steps 200 through 206, and is suitable for use in the system 100 but is more generally applicable to other systems comprising a virtual file system providing an interface between a physical file system and a plurality of clients.

In step 200, a virtual file system is configured to provide an interface between a physical file system and plurality of clients. With reference to the FIG. 1 embodiment, the virtual file system 104 is implemented between the physical file system 102 and the HPC system 105 comprising compute nodes 106. In other embodiments, the virtual file system may be implemented at least in part on the compute nodes 106 themselves, for example, using PLFS clients running on respective ones of the compute nodes.

In step 202, data files received from applications or other clients are transformed into data objects for object-based storage in data object stores of the physical file system. In the FIG. 1 embodiment, this transformation is performed by the data object processing module 120 of the virtual file system 104. The term "transforming" in this context and other similar contexts herein is intended to be broadly construed, so as to encompass, by way of example, a variety of different techniques for arranging data files into data objects or otherwise associating multiple data files with one or more data objects.

The transformation of data files into data objects in step 202 may involve, for example, associating multiple data files with a single data object. Examples of data file transformations of this type will be described in more detail below in conjunction with the illustrative embodiments of FIGS. 4 and 5.

As noted above, the virtual file system 104 may be implemented using PLFS and in such an embodiment transforming the data files into data objects may comprise associating multiple ones of the data files with a single PLFS object.

Figure 3:
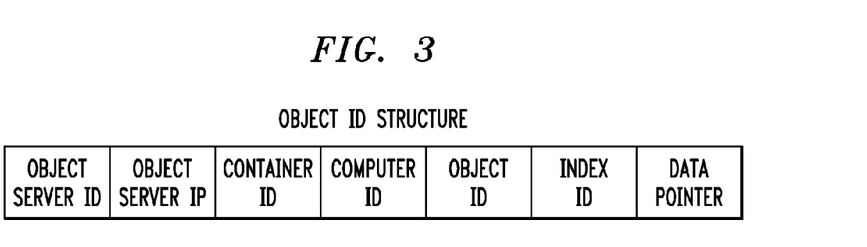
FIG. 3 shows an exemplary object identifier structure suitable for use in the information processing system of FIG. 1.

In transforming data files into objects, a given object is identified by an object identifier, also referred to herein as an object ID or OID. An exemplary object identifier structure suitable for use in embodiments of the invention is shown in FIG. 3, and comprises not only an object ID, but additional related information such as an object server ID, an object server IP address, a PLFS container ID, a computer ID, an index ID and a data pointer. A given OID instance may comprise only a subset of the exemplary OID fields illustrated in FIG. 3, possibly in combination with one or more additional or alternative fields.

Figure 2:
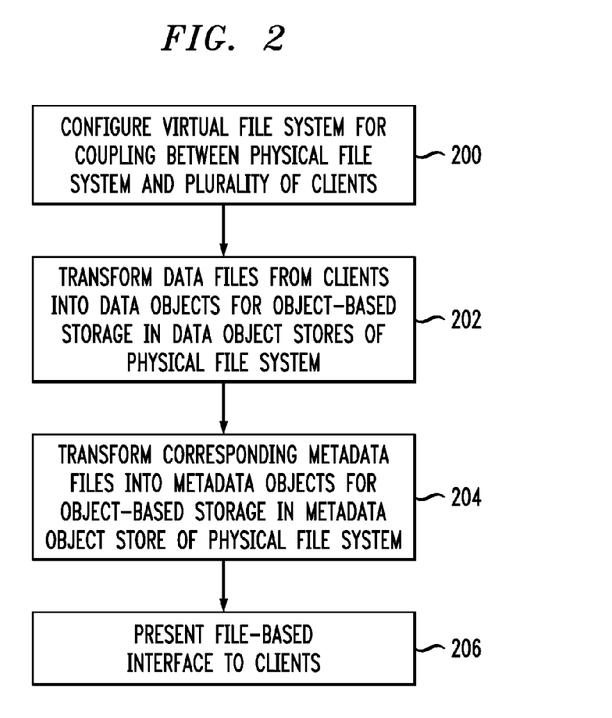
FIG. 2 is a flow diagram of an exemplary process implemented using the virtual file system and associated object stores in the information processing system of FIG. 1.

Referring again to the flow diagram of FIG. 2, metadata files corresponding to the transformed data files are transformed in step 204 into metadata objects for object-based storage in a metadata object store. As described above, such metadata objects may be illustratively configured to allow certain types of clients to directly access the corresponding data objects in the data object stores. The metadata objects may utilize OID fields similar to those illustrated in FIG. 3, such as a PLFS container ID.

Transformation of the metadata files into metadata objects is assumed to be performed in a manner analogous to that previously described in conjunction with step 202, but utilizing the metadata object processing module 122 of the virtual file system 104. Thus, for example, in an embodiment utilizing PLFS, transforming the metadata files into metadata objects may comprise associating multiple ones of the metadata files with a single PLFS object suitable for storage in the metadata object store 112. More detailed examples of metadata file transformations of this type will be described in more detail below in conjunction with the illustrative embodiments of FIGS. 4 and 5.

The metadata object associated with one or more data objects includes information indicating for each of the objects its corresponding location in one of the data object stores 110. This information may be supplemented by additional metadata characterizing the storage of the data objects in the physical file system. In the FIG. 1 embodiment, such storage is performed under the control of the virtual file system 104.

In step 206, a file-based interface is presented to the clients. For example, with reference to the FIG. 1 embodiment, the virtual file system 104 presents a file-based interface to clients associated with compute nodes 106. Thus, certain clients running on the compute nodes 106 can write and read data files as if the data files are stored as respective separate files in a parallel file system, with the virtual file system 104 providing transformation between files and objects as necessary.

As a more particular example, in an embodiment in which the virtual file system 104 is implemented using PLFS running on the compute nodes, PLFS clients on those nodes can perform at least a portion of the transformation between files and objects such that other clients running on the compute nodes see a file-based interface. It should therefore be understood that references herein to presentation of a file-based interface to clients are intended to encompass arrangements in which some clients running on the compute nodes 106 see such an interface while other clients on the compute nodes, such as the above-noted PLFS clients, are involved in providing the file-based interface. The clients that see the file-based interface illustratively comprise applications running on the compute nodes 106.

It was noted above that data objects stored in the data object stores 110 may be migrated between multiple storage tiers as necessary to facilitate achievement of desired performance levels. For example, in the FIG. 1 embodiment, the virtual file system 104 may migrate objects between multiple storage tiers of the physical file system 102 in order to achieve desired levels of JO performance responsive to requests received from one or more clients. Object migration and other object movement determinations may be based at least in part on monitoring of current levels of performance within the system 100. Such monitoring in the FIG. 1 embodiment is assumed to be performed under the direction of the virtual file system 104 and may involve the use of sensors of a sensor network, or various other types of monitoring arrangements. The particular types of operating conditions and other factors that are monitored can be varied depending upon the needs of a given implementation.

The movement of a given one of the objects between first and second storage tiers may be controlled at least in part based on information provided by a client comprising an application running on a corresponding compute node.

In some embodiments, multiple data files associated with a given one of the objects moved from a first storage tier to a second storage tier can be made directly accessible within the second storage tier by a corresponding one of the clients without requiring interaction between the client and the first storage tier.

When PLFS is used to implement the virtual file system 104, the virtual file system may comprise PLFS middleware including multiple synchronization daemons associated with respective OSSs of at least one of the storage tiers. A given such synchronization daemon is triggered by at least one of a read operation and a write operation associated with a client comprising an application running on a corresponding compute node.

In an arrangement of this type, a PLFS client also running on the compute node can effectively obscure the actual location of the objects from the application. Accordingly, in some embodiments, the application need not be aware of the movement of the objects as carried out and tracked using PLFS.

The metadata object store 112 is updated to reflect any migration of objects that has taken place in the physical file system 102. In the FIG. 1 embodiment, the updating of the metadata object store 112 to reflect current storage locations of the objects is assumed to be performed under the control of the virtual file system 104.

If the desired levels of performance have not been achieved, the manner in which the objects are stored across the storage tiers of the physical file system 102 can be altered. In the context of the FIG. 1 embodiment, this generally involves the virtual file system 104 determining and implementing an alternative object storage arrangement, different than the current object storage arrangement, so as to facilitate achievement of the desired levels of performance in the system 100.

If the desired levels have been achieved, the process simply continues to process files received from the clients. The above-noted determination as to whether or not desired levels of performance have been achieved is then repeated periodically and further adjustment of the manner in which the objects are distributed over the storage tiers is made as needed, possibly in response to changing operating conditions and other factors.

The particular processing operations and other system functionality described in conjunction with the flow diagram of FIG. 2 are presented by way of illustrative example only, and should not be construed as limiting the scope of the invention in any way. Alternative embodiments can use other types of processing operations using a virtual file system to implement data and metadata object stores in an underlying physical file system. For example, the ordering of the process steps may be varied in other embodiments, or certain steps may be performed concurrently with one another rather than serially. Also, one or more of the process steps may be repeated periodically for different processing applications, or performed in parallel with one another.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Exemplary object-based storage functionality implemented in illustrative embodiments will now be described in more detail with reference to FIGS. 4 and 5.

Figure 4:
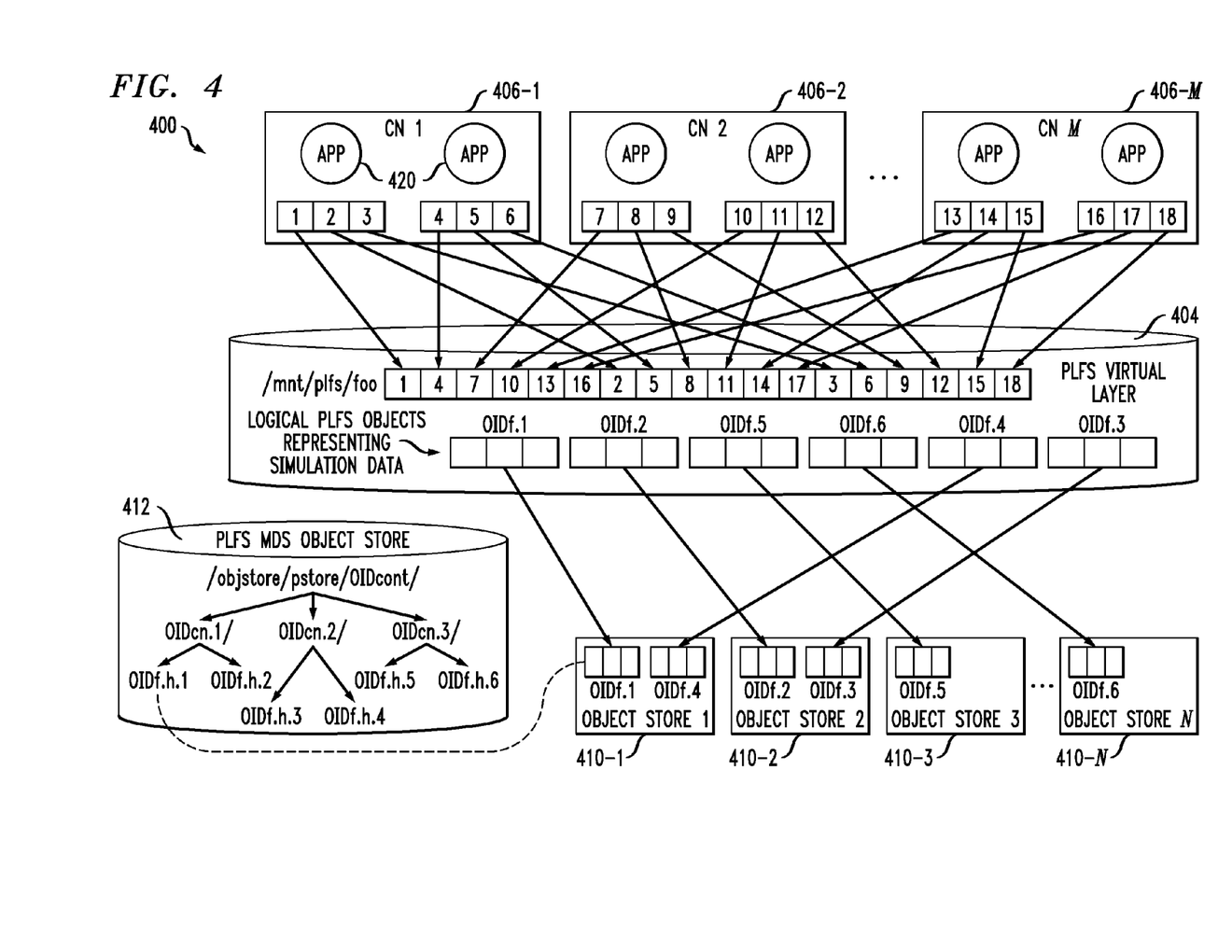
FIGS. 4 and 5 illustrate different configurations of a cluster file system in another embodiment of an information processing system.

FIG. 4 shows another information processing system 400 that includes a cluster file system implemented using a virtual file system and an underlying physical file system. The virtual file system in this embodiment illustratively comprises a PLFS virtual layer 404. The system 400 further comprises compute nodes or CNs 406-1, 406-2, . . . 406-M, which are assumed to represent compute nodes of a supercomputer. The CNs 406 are also denoted as CN 1, CN 2, . . . CN M, respectively.

Although shown in the figure as being separate from the compute nodes 406, the PLFS virtual layer 404 may be implemented at least in part using PLFS clients running on respective ones of the compute nodes 406.

Also included in the system 400 are a plurality of object stores of a physical file system, including data object stores 410-1, 410-2, 410-3, . . . 410-N, and a metadata object store 412 associated with a PLFS metadata server or MDS.

Each of the compute nodes 406 in the system 400 includes multiple applications 420. These applications in the present embodiment are assumed to comprise simulation applications running on the supercomputer. Such simulation applications each generate simulation data in the form of multiple data files. Although two applications 420 are shown in each compute node 406, a given such compute node can of course include more than two applications or just a single application. The applications 420 should be viewed as one possible example of clients that are presented with a file-based interface by the PLFS virtual layer 404.

In the FIG. 4 embodiment, the applications 420 running on the compute nodes 406 each generate multiple data files that are illustrated as a group of three data files below the corresponding application 420. These data files are received by the PLFS virtual layer 404 in an interspersed manner as illustrated, and are transformed by the PLFS virtual layer 404 into logical PLFS objects representing simulation data.

The PLFS virtual layer 404 more particularly generates separate objects for each of the groups of three data files generated by the applications 420. In the figure, there are six groups of three data files generated by respective ones of the six exemplary applications, and these groups are arranged into respective data objects denoted OIDf.1, OIDf.2, OIDf.3, OIDf.4, OIDf.5 and OIDf.6. Each such data object is assumed to be configured in a manner compliant with the T10 Object Storage Device (OSD) standard, although other types of data objects can be used. The term "object" as used herein should not be viewed as requiring use of T10 OSD objects or any other particular object format.

Each T10 OSD object is assumed to be part of a larger PLFS file, mounted in this embodiment under a file directory denoted /mnt/plfs/foo.

In the present embodiment, the PLFS virtual layer 404 utilizes a container directory structure that allows the applications 420 to write data files in random order. These data files are reorganized by the PLFS virtual layer 404 into separate data objects for each of the applications 420 running on the compute nodes 406, as indicated above. The PLFS virtual layer 404 distributes the resulting data objects for storage over particular ones of the data object stores 410 as indicated in the figure.

Also, one or more metadata files associated with the data files are arranged into metadata objects for storage in the metadata object store 412. More particularly, metadata objects corresponding to a PLFS container are stored in a directory denoted /objstore/pstore/OlDcont. This container may be viewed as comprising portions denoted OIDcn.1, OIDcn.2 and OIDcn.3, associated with respective ones of the compute nodes 406, with each such portion comprising multiple metadata objects.

These metadata objects illustratively include metadata objects denoted OIDf.h.1, OIDf.h.2, OIDf.h.3, OIDf.h.4, OIDf.h.5 and OIDf.h.6 corresponding to the respective data objects identified as OIDf.1, OIDf.2, OIDf.3, OIDf.4, OIDf.5 and OIDf.6 in the data object stores 410. The metadata objects include at least a portion of the information shown in FIG. 3, and more particularly a hyperlink or other pointer to the corresponding data object.

This arrangement permits PLFS clients running on respective ones of the compute nodes 406 to determine the actual locations of particular data objects in the data object stores 410. For example, such a PLFS client accesses the metadata object OIDf.h.1 in order to obtain a hyperlink that when activated directs the PLFS client to the particular location in the data object store 410-1 that currently stores the corresponding data object OIDf.1. This connection between the metadata object OIDf.h.1 and the corresponding data object OIDf.1 is illustrated by a dashed line between the respective identifiers in the figure. The other data objects OIDf.2 through OIDf.6 can be retrieved by the PLFS clients in a similar manner, utilizing the respective metadata objects OIDf.h.2 through OIDf.h.6.

It should be noted in this context that the term "metadata file" as used herein is intended to be broadly construed, and may comprise information such as directory information, data hyperlinks or pointers, or other types of information indicative of the manner in which data files are stored as objects within the data object stores 410. Such information illustratively includes at least a portion of the information shown in FIG. 3.

In the FIG. 4 embodiment, the portion OIDcn.1 of PLFS container OlDcont is associated with compute node 406-1 and provides metadata objects OIDf.h.1 and OIDf.h.2. OIDcn.1 maps to a first subdirectory of a file-based interface presented by the PLFS virtual layer 404 to the applications 420.

Similarly, the portion OIDcn.2 of the PLFS container OlDcont is associated with compute node 406-2 and provides metadata objects OIDf.h.3 and OIDf.h.4. OIDcn.2 maps to a second subdirectory of a file-based interface presented by the PLFS virtual layer 404 to the applications 420.

Assuming by way of example that M=3, the portion OIDcn.3 of the PLFS container OIDcont is associated with compute node 406-3 and provides metadata objects OIDf.h.5 and OIDf.h.6. It maps to a third subdirectory of a file-based interface presented by the PLFS virtual layer 404 to the applications 420.

In the foregoing, it is assumed that the applications on the compute nodes 406-1, 406-2 and 406-3 write to and read from their respective data files in the respective first, second and third directories. It appears to these applications that they are accessing the data files from a parallel file system rather than from object stores.

As mentioned above, a virtual file system such as that provided by the PLFS virtual layer 404 can be configured to control the movement of data objects over multiple storage tiers of a physical file system in order to meet performance goals. An example of such object movement for the FIG. 4 embodiment is illustrated in FIG. 5, which generally shows the same components as previously described, but shows a rebalancing that occurs under the control of the PLFS virtual layer 404. The rebalancing in this example involves moving the data object corresponding to OIDf.4 from the data object store 410-1 to a different data object store 410-$n$, possibly on a different storage tier, which may be a faster storage tier or a slower storage tier relative to that associated with data object store 410-1. The associated metadata object OIDf.h.4 is updated accordingly.

Figure 5:
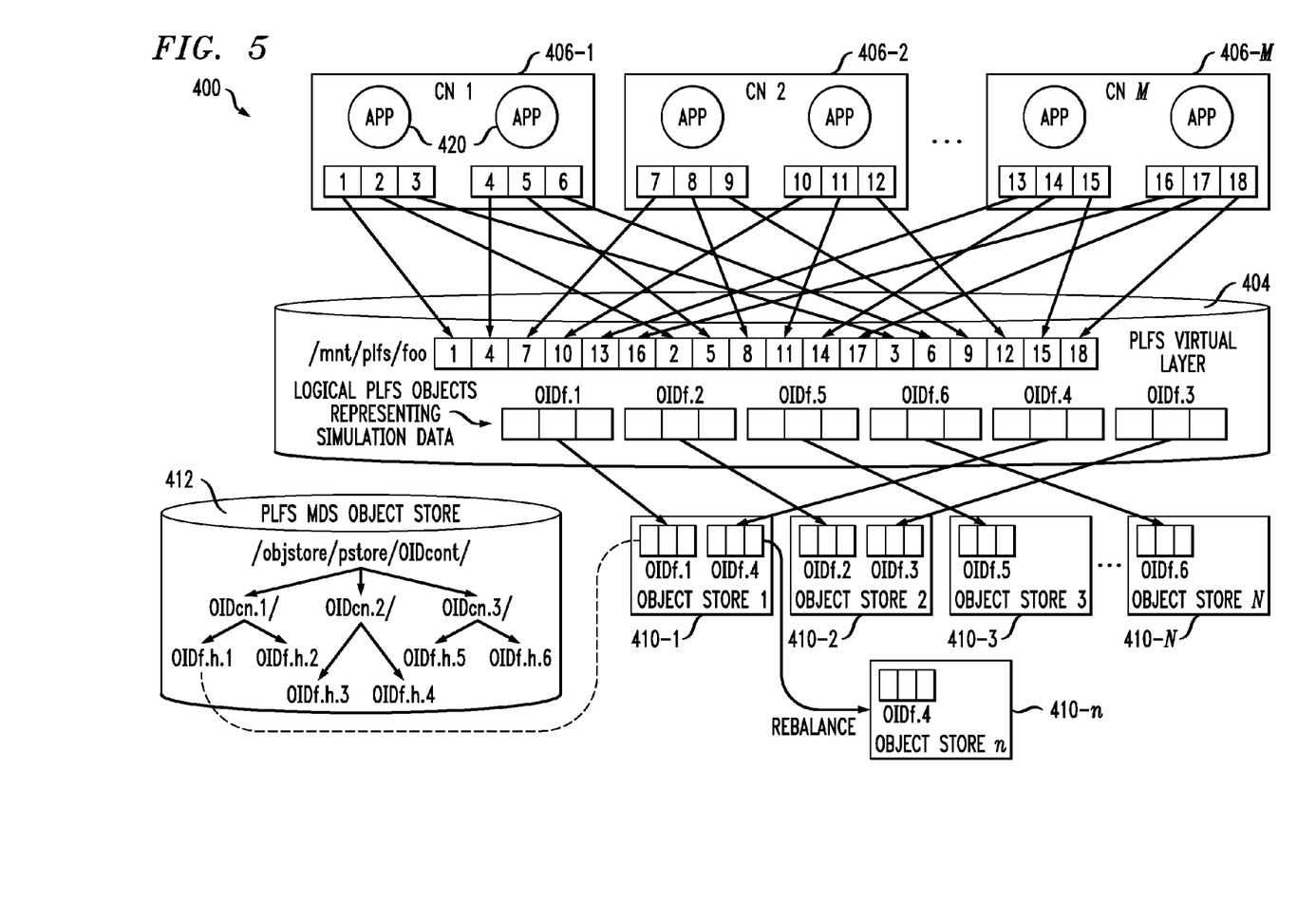

It should be understood that the particular file, object and storage arrangements of FIGS. 4 and 5 are presented by way of illustrative example only, and should not be construed as limiting in any way.

In other embodiments, clients may be implemented at least in part utilizing an IO forwarding scalability layer (IOFSL) in place of or in addition to the exemplary PLFS clients described above.

The embodiments of FIGS. 4 and 5 may be viewed as exemplary arrangements in which a virtual file system is implemented using PLFS. A given parallel file system implemented in the physical file system can be essentially any type of file system, including Lustre, NFS, GPFS, Ceph and numerous others.

The disclosed arrangements can be used to construct a high-performance cluster file system using any underlying physical file system. Moreover, the use of a virtual file system to implement data object stores and one or more associated metadata object stores allows compute nodes of supercomputers and other HPC systems to seamlessly access data files within the cluster file system.

Illustrative embodiments disclosed herein also make it possible to dynamically balance the conflicting requirements of storage capacity and IO throughput, thereby avoiding situations in which either performance is less than optimal or the costs of implementing the system become excessive. Arrangements of this type can provide further acceleration of IO operations in the system 100, leading to enhanced system performance relative to conventional arrangements, while additionally or alternatively providing an ability to achieve particular levels of performance at lower cost.

It is to be appreciated that the particular virtual file system and object store arrangements illustrated in FIGS. 4 and 5 are exemplary only, and numerous other arrangements may be used in other embodiments.

For example, the disclosed techniques may be adapted in a straightforward manner for providing efficient access to object-based storage distributed over more than two distinct storage tiers.

It was noted above that portions of the information processing system 100 may be implemented using one or more processing platforms. Illustrative embodiments of such platforms will now be described in greater detail. Although described in the context of system 100, these platforms may also be used to implement at least portions of the information processing system 400 of FIGS. 4 and 5, as well as other information processing systems in other embodiments of the invention.

Figure 6:
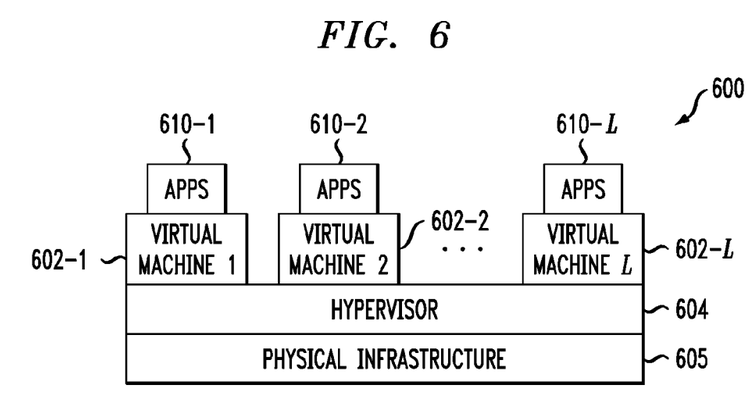
FIGS. 6 and 7 show examples of processing platforms that may be utilized to implement at least a portion of each of the information processing systems of FIG. 1 and FIGS. 4 and 5.
Figure 7:
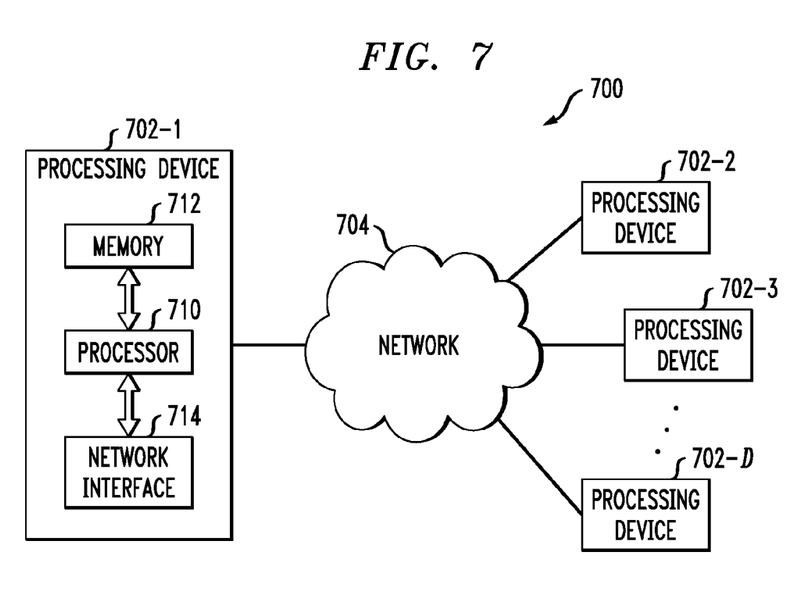

As shown in FIG. 6, portions of the information processing system 100 may comprise cloud infrastructure 600. The cloud infrastructure 600 comprises virtual machines (VMs) 602-1, 602-2, ... 602-L implemented using a hypervisor 604. The hypervisor 604 runs on physical infrastructure 605. The cloud infrastructure 600 further comprises sets of applications 610-1, 610-2, ... 610-L running on respective ones of the virtual machines 602-1, 602-2, ... 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of a burst buffer appliance or other component of the system 100.

An example of a commercially available hypervisor platform that may be used to implement hypervisor 604 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as the above-noted VNX® and Symmetrix VMAX®. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, ... 702-D, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 722 may comprise random access memory (RAM), read-only memory (ROM) or other types of memory, in any combination. The memory 722 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of a virtual file system or underlying physical file system as disclosed herein can be implemented at least in part in the form of one or more software programs stored in memory and executed by a processor of a processing device such as one of the virtual machines 602 or one of the processing devices 702. For example, the modules 120 and 122 of the virtual file system 104 in the FIG. 1 embodiment are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of information processing systems, virtual and physical file systems and HPC system or other computer systems that can benefit from the performance advantages associated with object-based storage. Also, the particular configurations of system and device elements shown in FIGS. 1 and 4-7 can be varied in other embodiments. Thus, for example, the particular type of virtual file system and physical file system deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   a virtual file system configured for coupling between a physical file system and a plurality of clients;
   the virtual file system comprising:
      a data object processing module configured to receive a plurality of data files from each of one or more of the clients and to transform said data files into data objects for object-based storage in at least one data object store of the physical file system; and
      a metadata object processing module configured to receive a plurality of metadata files associated with the data files and to transform said metadata files into metadata objects for object-based storage in at least one metadata object store of the physical file system;
   the virtual file system thereby providing multiple object stores utilizing the physical file system for independent storage of data objects and metadata objects but presenting a file-based interface to the clients;
   wherein the virtual file system is implemented using at least one processing device comprising a processor coupled to a memory.

2. The apparatus of claim 1 wherein the clients comprise respective applications running on compute nodes of a computer system.

3. The apparatus of claim 1 wherein the physical file system comprises a plurality of storage tiers and the virtual file system controls movement of at least a portion of the data objects and the metadata objects between the storage tiers.

4. The apparatus of claim 3 wherein the plurality of storage tiers includes at least one tier of flash storage devices and at least one tier of disk storage devices.

5. The apparatus of claim 3 wherein the plurality of storage tiers includes at least first and second storage tiers comprising respective disjoint subsets of a plurality of object storage servers, with the object storage servers in the first storage tier being configured to interface with object storage targets of a first type and the object storage servers in the second storage tier being configured to interface with object storage targets of a second type different than the first type, and wherein the first and second different types of object storage targets provide respective different levels of performance.

6. The apparatus of claim 5 wherein the object storage targets of the first type comprise respective flash storage devices and the object storage targets of the second type comprise respective disk storage devices.

7. The apparatus of claim 1 wherein the virtual file system comprises a parallel log-structured file system (PLFS).

8. The apparatus of claim 7 wherein at least a portion of the data objects and metadata objects correspond to respective logical PLFS objects each having a distinct object identifier.

9. The apparatus of claim 7 wherein the PLFS comprises middleware including a plurality of synchronization daemons associated with respective object storage servers of the physical file system, and wherein a given one of the synchronization daemons is triggered by at least one of a read operation and a write operation associated with a client comprising an application running on a corresponding compute node.

10. The apparatus of claim 7 wherein the virtual file system comprises a plurality of PLFS clients running on respective ones of the compute nodes and wherein the PLFS clients are configured to control movement of at least a portion of the data objects and the metadata objects between multiple storage tiers of the physical file system in a manner that obscures movement of said objects from applications running on the respective compute nodes.

11. The apparatus of claim 1 wherein the data object processing module is further configured to retrieve a plurality of data objects from the physical file system and to transform said data objects into data files for delivery to one or more of the clients.

12. The apparatus of claim 1 wherein the metadata object processing module is further configured to retrieve a plurality of metadata objects from the physical file system and to transform said metadata objects into metadata files for use in processing the data files.

13. The apparatus of claim 1 wherein a given one of the metadata objects comprises an index file indicating a manner in which a plurality of data files are stored in the physical file system using one or more data objects.

14. A processing platform comprising the apparatus of claim 1.

15. The apparatus of claim 1 wherein a given metadata object stored by the metadata object store comprises a data pointer to a particular location in the data object store that currently stores a corresponding data object.

16. The apparatus of claim 1 wherein a given metadata object stored by the metadata object store comprises a hyperlink that if activated by one of the clients directs that client to a particular location in the data object store that currently stores a corresponding data object.

17. The apparatus of claim 1 wherein transforming data files into data objects for object-based storage comprises associating multiple data files with a single data object having a unique object identifier.

18. A method comprising:
configuring a virtual file system for coupling between a physical file system and a plurality of clients;
receiving a plurality of data files from each of one or more of the clients;
transforming said data files into data objects for object-based storage in at least one data object store of the physical file system;
receiving a plurality of metadata files associated with the data files; and
transforming said metadata files into metadata objects for object-based storage in at least one metadata object store of the physical file system;
the virtual file system thereby implementing multiple object stores utilizing the physical file system for independent storage of data objects and metadata objects but presenting a file-based interface to the clients;
wherein the configuring, receiving and transforming are implemented using at least one processing device comprising a processor coupled to a memory.

19. The method of claim 18 wherein configuring the virtual file system comprises configuring the virtual file system as a parallel log-structured file system (PLFS) and further wherein at least a portion of the data objects and metadata objects correspond to respective logical PLFS objects each having a distinct object identifier.

20. The method of claim 18 further comprising:
retrieving a plurality of data objects from the physical file system;
transforming said data objects into data files for delivery to one or more of the clients;
retrieving a plurality of metadata objects from the physical file system; and
transforming said metadata objects into metadata files for use in processing the data files.

21. An article of manufacture comprising a processor-readable storage medium having stored therein program code of one or more software programs, wherein the program code when executed by said at least one processing device causes the method of claim 18 to be performed.

22. An information processing system comprising:
a computer system comprising a plurality of clients; and
a cluster file system coupled to the computer system and comprising:
a physical file system; and
a virtual file system arranged between the physical file system and the plurality of clients;
the virtual file system comprising:
a data object processing module configured to receive a plurality of data files from each of one or more of the clients and to transform said data files into data objects for object-based storage in at least one data object store of the physical file system; and
a metadata object processing module configured to receive a plurality of metadata files associated with the data files and to transform said metadata files into metadata objects for object-based storage in at least one metadata object store of the physical file system;
the virtual file system thereby implementing multiple object stores utilizing the physical file system for independent storage of data objects and metadata objects but presenting a file-based interface to the clients.

23. The system of claim 22 wherein the virtual file system comprises a parallel log-structured file system (PLFS) and further wherein at least a portion of the data objects and metadata objects correspond to respective logical PLFS objects each having a distinct object identifier.

* * * * *